(12) United States Patent
Goncalves

(10) Patent No.: US 9,980,462 B2
(45) Date of Patent: May 29, 2018

(54) VERTICAL URINE PAD HOLDER FOR CANINES

(71) Applicant: Julio Cesar Goncalves, Danbury, CT (US)

(72) Inventor: Julio Cesar Goncalves, Danbury, CT (US)

( * ) Notice: Subject to any disclaimer, the term of this patent is extended or adjusted under 35 U.S.C. 154(b) by 178 days.

(21) Appl. No.: 15/186,480

(22) Filed: Jun. 19, 2016

(65) Prior Publication Data

US 2017/0359999 A1    Dec. 21, 2017

(51) Int. Cl.
*A01K 1/01* (2006.01)
*A01K 1/015* (2006.01)

(52) U.S. Cl.
CPC .................. *A01K 1/0157* (2013.01)

(58) Field of Classification Search
CPC .. A01K 1/0107; A01K 1/0152; A01K 1/0125; A01K 1/0157; A01K 1/0114; A01K 15/02; A01K 1/011; A01K 1/015; A01K 23/005; A01K 29/00
USPC .................................................. 119/165–171
See application file for complete search history.

(56) References Cited

U.S. PATENT DOCUMENTS

| | | | | |
|---|---|---|---|---|
| 1,773,141 A * | 8/1930 | Hodgson | ............... | A01K 1/0107 119/165 |
| D214,739 S * | 7/1969 | Freeborn | ....................... | D30/161 |
| 4,147,129 A * | 4/1979 | Ruplen | ................ | A01K 1/0353 119/169 |
| 4,715,320 A * | 12/1987 | Barnhart | .............. | A01K 1/0107 119/169 |
| 4,907,540 A * | 3/1990 | Reynolds | ............. | A01K 13/002 119/621 |
| 4,986,218 A * | 1/1991 | Cassone | ............... | A01K 1/0107 119/169 |
| 5,080,046 A * | 1/1992 | Cassone | ............... | A01K 1/0125 119/165 |
| 5,592,901 A * | 1/1997 | Birmingham | ........ | A01K 15/024 119/706 |
| 5,619,953 A * | 4/1997 | Griffin | ................. | A01K 15/024 119/621 |
| 6,343,569 B1 * | 2/2002 | Buendiger | ........... | A01K 15/024 119/706 |
| 6,360,692 B2 * | 3/2002 | Gear | ..................... | A01K 15/024 119/706 |
| 6,367,423 B1 * | 4/2002 | Scheuer | ................. | A01K 1/035 119/706 |
| 6,550,423 B1 * | 4/2003 | Pope | ..................... | A01K 1/0107 119/161 |

(Continued)

Primary Examiner — Yvonne R Abbott-Lewis
(74) Attorney, Agent, or Firm — Ruben Alcoba, Esq.

(57) ABSTRACT

A vertical urine pad holder that is comprised of a rectangular frame that has width a height and a length, the frame has two arms, each arm is perpendicular to the length of the frame and has a length of at least four inches. The width of the frame is at least 1 inch. The invention is further comprised of a urine pad. In an embodiment of the present invention, the urine pad is pre-marked by a scent that will encourage dogs to spray in the location in which the urine pad is draped or placed. The urine pad holder is used by placing or fitting the urine pad over the arms of the holder and then sliding or mounting the holder over a corner wall or door frame so that the urine pad covers the wall or door frame that is to be protected.

6 Claims, 2 Drawing Sheets

(56) References Cited

U.S. PATENT DOCUMENTS

| | | | | |
|---|---|---|---|---|
| 7,207,293 | B2 * | 4/2007 | Deming, Jr. | A01K 15/024 |
| | | | | 119/706 |
| 8,220,622 | B1 * | 7/2012 | Lewis | A01K 1/0107 |
| | | | | 119/168 |
| 8,225,748 | B2 * | 7/2012 | Crawford | A01K 1/0107 |
| | | | | 119/161 |
| 8,336,497 | B2 * | 12/2012 | van Zuilekom | A01K 1/0107 |
| | | | | 119/165 |
| 9,532,546 | B1 * | 1/2017 | Klein, Jr. | A01K 1/0107 |
| 2001/0025910 | A1 * | 10/2001 | Olivadoti | A01K 1/0107 |
| | | | | 248/346.01 |

* cited by examiner

VERTICAL URINE PAD HOLDER FOR CANINES

BACKGROUND

The present invention is directed to a vertical urine pad holder that is used to train and protect walls or door frames that have been marked with urine by a canine.

Male dogs tend to mark their territory within a house by spraying urine on walls or door openings. Dogs spray locations within a house to deliver their scents to other dogs. It is believed that they spray the house to inform other dogs or animals of their territory and of their dominance within the territory.

One of the problems with the dogs spraying locations within a house is that, if you have more than one dog, all dogs will spray the same location in order to show their dominance and their claim to a specific territory.

The present invention is directed to a vertical frame that is placed on a corner wall or on a door frame. The frame is used by first placing a urine pad on the frame and then placing the frame over a corner wall or a door frame so that the urine pad is securely draped over the corner wall or the door frame.

The present invention allows the canines to mark their territory within a home, while preventing the walls or door frame from being damaged.

For the foregoing reasons, there is a need for a vertical urine pad holder that is used to train and protect walk or door frames that have been marked with urine by a canine.

SUMMARY

The present invention describes a vertical urine pad holder that is used to train and protect walls or door frames that have been marked with urine by a canine.

The present invention is a vertical urine pad holder that is comprised of a rectangular frame that has width a height and a length, the frame has two arms, each arm is perpendicular to the length of the frame and has a length of at least four inches. The width of the frame is at least 1 inch. The invention is further comprised of a urine pad. In an embodiment of the present invention, the urine pad is pre-marked by a scent that will encourage dogs to spray in the location in which the urine pad is draped or placed.

The present invention is used by placing or fitting the urine pad over the arms of the present invention and then sliding or mounting the present invention over a corner wall or door frame so that the urine pad covers the wall or door frame that is to be protected.

An object of the present invention is to provide a device for controlling the location that will be sprayed by a canine when the canine marks his territory.

Another object of the present invention is to protect a wall or door frame from being marked by urine by a dog marking his territory.

Yet another object of the present invention is to provide a vertical urine pad holder that will capture some of the urine spray bounced from the pad being sprayed.

DRAWINGS

These and other features, aspects, and advantages of the present invention will become better understood with regard to the following description, appended claims, and drawings where:

FIG. 1 is an isometric view of the urine pad holder, the urine pad, and a wall in which the present invention is mounted on;

DESCRIPTION

Figure 1:
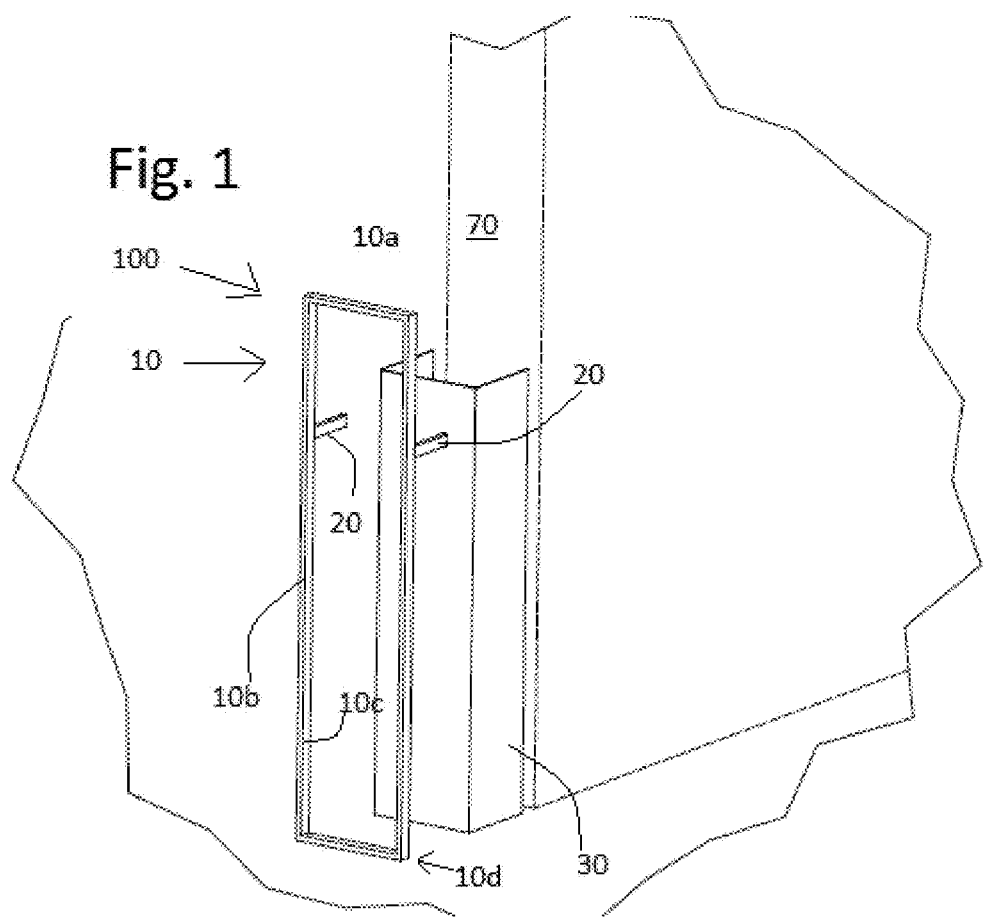
Figure 2:
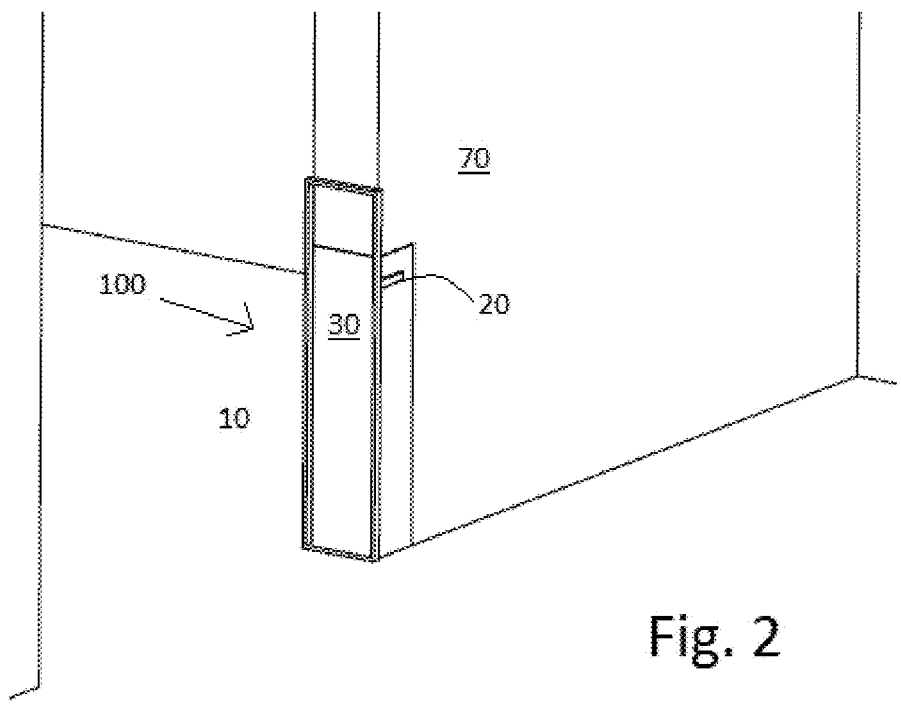
FIG. 2 is an isometric view of the present invention when it is mounted on a wall.
Figure 3:
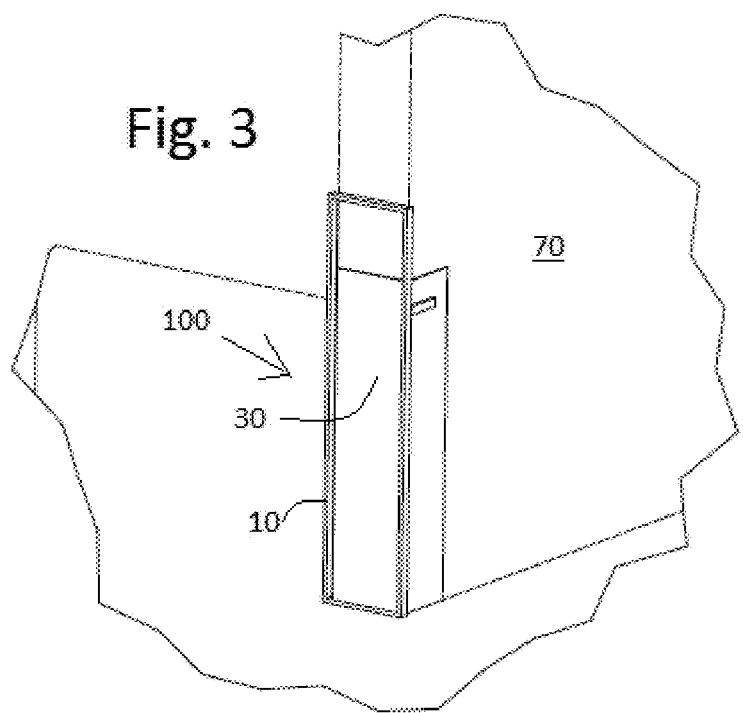
FIG. 3 is an exploded view of FIG. 2.

As seen in FIGS. 1-3, the present invention is a vertical urine pad holder that is used to train and protect walls or door frames that have been marked by a canine. The vertical urine pad holder 100 comprises of a rectangular frame 10 that has width 10a, a height 10b, and a length 10c, the frame 10 has two arms 20, each arm 20 is perpendicular to the length 10c of the frame 10 and has a length of at least four inches. The height 10b of the rectangular frame 10 is at least 1 inch. The invention is further comprised of a urine pad 30. In an embodiment of the present invention, the urine pad 30 is pre-marked by a scent that will encourage dogs to spray in the location in which the urine pad is draped or placed. The height of the rectangular frame is at least 18 inches and the arms are positioned at a location that is at least 12 inches from an end 10d of the frame 10. The width 10a of the frame is at least 3.5 inches.

In an embodiment of the present invention, the frame 10 will be made of stainless steel. In other embodiments the frame will be made of wood or plastics.

The present invention is used by placing or fitting the urine pad over 30 the arms of the present invention and then sliding or mounting the present invention over a corner wall 70 or door frame so that the urine pad 30 covers the wall or door frame that is to be protected.

An advantage of the present invention is that it provides a device for controlling the location that will be sprayed by a canine when the canine marks his territory.

Another advantage of the present invention is that it protects a wall of door frame from being marked by urine by a dog marking his or her territory.

Yet another advantage of the present invention is that it provides a vertical urine pad holder that captures some of the urine spray bounced from the pad being sprayed.

While the description above contains many specificities, these should not be construed as limitations on the scope, but rather as an exemplification of several preferred embodiments thereof. Many other variations are possible. Accordingly, the scope should be determined not by the embodiments illustrated, but by the appended claims and their legal equivalents.

What is claimed is:

1. A vertical urine pad holder that is used to train and protect walls or door frames that are marked by a canine, the urine pad holder comprises:
    a rectangular frame 10 that has width 10a, a height 10b, and a length 10c;
    a pair of arms 20 attached to the frame 10, each arm 20 is perpendicular to the length 10c of the frame 10 and has a length of at least four inches, the height 10b of the rectangular frame 10 is at least 1 inch; and
    a urine pad 30, the urine pad is placed over the arms prior to the frame being secured on a corner or a door frame.

2. The vertical urine pad holder of claim 1, wherein the urine pad is pre-marked by a scent that will encourage a canine to spray on the urine pad.

3. The vertical urine pad holder of claim 2, wherein the height of the rectangular frame is at least 18 inches long and the arms are positioned at a location that is at least 12 inches from an end 10*d* of the frame, and the width of the frame is at least 3.5 inches long.

4. The vertical urine pad holder of claim 1, wherein the frame is made of a stainless steel.

5. The vertical urine pad holder of claim 1, wherein the frame is made of a plastic.

6. The vertical urine pad holder of claim 1, wherein the frame is placed on a corner wall or a door frame.

* * * * *